(12) United States Patent
Yamaguchi et al.

(10) Patent No.: US 11,628,573 B2
(45) Date of Patent: Apr. 18, 2023

(54) UNMANNED TRANSFER ROBOT SYSTEM

(71) Applicant: FANUC CORPORATION, Yamanashi (JP)

(72) Inventors: Youhei Yamaguchi, Yamanashi (JP); Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 200 days.

(21) Appl. No.: 16/826,530

(22) Filed: Mar. 23, 2020

(65) Prior Publication Data

US 2020/0338742 A1  Oct. 29, 2020

(30) Foreign Application Priority Data

Apr. 26, 2019 (JP) .............................. JP2019-085596

(51) Int. Cl.
 *B25J 9/16* (2006.01)
 *B25J 13/08* (2006.01)
 (Continued)

(52) U.S. Cl.
 CPC ............. *B25J 9/1694* (2013.01); *B25J 9/163* (2013.01); *B25J 9/1679* (2013.01); *B25J 13/08* (2013.01); *B25J 19/02* (2013.01); *B25J 5/007* (2013.01)

(58) Field of Classification Search
 CPC ........ B25J 9/1694; B25J 9/163; B25J 9/1679; B25J 9/162; B25J 13/00; B25J 13/08;
 (Continued)

(56) References Cited

U.S. PATENT DOCUMENTS

2013/0338525 A1\* 12/2013 Allen ..................... A61B 5/742
                                                              600/534
2015/0355333 A1    12/2015 Ono et al.
(Continued)

FOREIGN PATENT DOCUMENTS

JP       H11226889 A      8/1999
JP      2008181245 A      8/2008
(Continued)

OTHER PUBLICATIONS

Japanese Notice of Reasons for Refusal dated Jun. 1, 2021, for Japanese Patent Application No. 2019085596.
(Continued)

*Primary Examiner* — Abby Y Lin
*Assistant Examiner* — Dylan Brandon Mooney
(74) *Attorney, Agent, or Firm* — Karceski IP Law, PLLC

(57) ABSTRACT

The present invention provides an unmanned transfer robot system including: an unmanned transfer vehicle capable of traveling on a road surface between a plurality of work stations; a robot that is mounted on the unmanned transfer vehicle; a sensor that is mounted on the robot and that detects a condition of the road surface; and a control unit that controls the robot and the unmanned transfer vehicle. Within an operation range of the robot, the sensor is disposed at a position where the sensor can detect a condition of the road surface in the periphery of the unmanned transfer vehicle, and the control unit controls the unmanned transfer vehicle on the basis of the condition of the road surface acquired by the sensor.

7 Claims, 5 Drawing Sheets

(51) Int. Cl.
    *B25J 5/00*    (2006.01)
    *B25J 19/02*   (2006.01)

(58) Field of Classification Search
    CPC .......... B25J 19/02; B25J 19/023; B25J 5/007; G05D 1/0223; G05D 1/0246; G05D 1/0221
    See application file for complete search history.

(56) References Cited

U.S. PATENT DOCUMENTS

| | | | |
|---|---|---|---|
| 2017/0052542 A1* | 2/2017 | Etoh | F16M 11/28 |
| 2017/0090033 A1* | 3/2017 | Matsuyama | G01S 17/931 |
| 2018/0021954 A1 | 1/2018 | Fischer et al. | |
| 2018/0059667 A1 | 3/2018 | Kuroda | |
| 2019/0018416 A1* | 1/2019 | Gassend | G05D 1/0246 |
| 2019/0227543 A1* | 7/2019 | Choe | B60W 40/06 |
| 2019/0277397 A1* | 9/2019 | Tsuge | F16H 61/04 |

FOREIGN PATENT DOCUMENTS

| | | | | |
|---|---|---|---|---|
| JP | 2010162635 A | * | 7/2010 | |
| JP | 2010162635 A | | 7/2010 | |
| JP | 2012139792 A | | 7/2012 | |
| JP | 2015175827 A | | 10/2015 | |
| JP | 2015230551 A | | 12/2015 | |
| JP | 2017102705 A | | 6/2017 | |
| JP | 2017130045 A | | 7/2017 | |
| JP | 2018010412 A | | 1/2018 | |
| JP | 2018032282 A | * | 3/2018 | .......... B60W 40/076 |
| JP | 2018032282 A | | 3/2018 | |
| JP | 2018092527 A | | 6/2018 | |
| JP | 2019021220 A | | 2/2019 | |
| JP | 2019059248 A | | 4/2019 | |
| WO | 2018017918 A1 | | 1/2018 | |
| WO | WO-2020015165 A1 | * | 1/2020 | |

OTHER PUBLICATIONS

Search Report by Registered Search Organization dated May 26, 2021, for Japanese Patent Application No. 2019085596.

* cited by examiner

UNMANNED TRANSFER ROBOT SYSTEM

CROSS-REFERENCE TO RELATED APPLICATIONS

This application is based on and claims priority to Japanese Patent Application No. 2019-085596, filed on Apr. 26, 2019, the entire contents of which are incorporated herein by reference.

FIELD OF THE INVENTION

The present disclosure relates to an unmanned transfer robot system.

BACKGROUND OF THE INVENTION

There is a known arrangement robot that travels while having a manipulator mounted thereon, said manipulator being provided with a sensor, such as a laser sensor or a camera, at a hand portion thereof (for example, see Japanese Unexamined Patent Application, Publication No. 2012-139792).

This arrangement robot, when moving, operates the manipulator to perform measurement by means of the sensor, and is automatically controlled on the basis of the acquired information. Also when holding a target object with the manipulator, the arrangement robot operates the manipulator to perform measurement by means of the sensor, and automatically controls the holding task performed by the manipulator on the basis of the acquired information.

The arrangement robot in Japanese Unexamined Patent Application, Publication No. 2012-139792 sequentially transfers a cleaning robot for cleaning a panel member, such as a solar panel or a heliostat, onto an uncleaned panel member. For this purpose, the arrangement robot travels while measuring the position of a panel member and the presence/absence of an obstacle by means of the sensor, measures the inclination of the panel member and the position of the cleaning robot, and performs recovery, transfer, and mounting of the cleaning robot.

SUMMARY OF THE INVENTION

In order for a robot mounted on an unmanned transfer vehicle to perform work at a plurality of work stations, the robot needs to be precisely positioned with respect to the individual work stations. In addition, to perform positioning of the robot at the individual work stations in a simple manner, it is preferable that the unmanned transfer vehicle travel between the work stations without deviating from a traveling path by a large amount.

An aspect of the present disclosure is an unmanned transfer robot system including: an unmanned transfer vehicle capable of traveling on a road surface between a plurality of work stations; a robot that is mounted on the unmanned transfer vehicle and that performs work at each of the work stations; a sensor that is mounted on the robot and that detects a condition of the road surface; and a control unit that controls the robot and the unmanned transfer vehicle. The robot has an operating range such that the robot can dispose the sensor at a position where the sensor can detect a condition of the road surface at least in front of the unmanned transfer vehicle in a traveling direction, and the control unit controls the unmanned transfer vehicle on the basis of the condition of the road surface acquired by the sensor.

BRIEF DESCRIPTION OF THE DRAWINGS

FIG. 1 is a perspective view showing an unmanned transfer robot system according to an embodiment of the present disclosure.

FIG. 2 is a schematic plan view showing an example of a traveling path of an unmanned transfer vehicle in the unmanned transfer robot system in FIG. 1.

FIG. 3 is a perspective view showing an example of the orientation of a robot that detects the condition of a road surface by means of a sensor in the unmanned transfer robot system in FIG. 1.

FIG. 4 is a perspective view for explaining the operation of the robot in the unmanned transfer robot system in FIG. 1, in a case in which the traveling path is curved.

FIG. 5 is a perspective view showing the operation of the robot in the unmanned transfer robot system in FIG. 1, in a case in which a traveling speed of the unmanned transfer vehicle is high.

DESCRIPTION OF EMBODIMENT(S) OF THE INVENTION

An unmanned transfer robot system 1 according to an embodiment of the present disclosure will be described below with reference to the drawings.

As shown in FIG. 1, the unmanned transfer robot system 1 according to this embodiment includes: a self-propelled unmanned transfer vehicle 2 capable of traveling on a road surface; a robot 3 that is mounted on the unmanned transfer vehicle 2; a sensor 4 that is mounted on the robot 3; and a control unit 5 that is mounted on the unmanned transfer vehicle 2 and that controls the robot 3 and the unmanned transfer vehicle 2.

The unmanned transfer vehicle 2 is a steerable four-wheel vehicle, has the robot 3 mounted on a top surface thereof, and also has a mounting table 6 on which a workpiece or the like is mounted within an operating range of the robot 3.

As shown in FIG. 2, in order to carry out work by the robot 3 at a plurality of work stations A, B, the unmanned transfer vehicle 2 is caused to travel along a predetermined traveling path C between the work stations A, B. The traveling path C is stored in the control unit 5, and the unmanned transfer vehicle 2 is caused to move along the traveling path C by means of an arbitrary method, such as GPS, SLAM, or magnetic induction.

The robot 3 is, for example, a six-axis articulated robot. The robot 3 includes a base 7 that is fixed on the top surface of the unmanned transfer vehicle 2, and a revolving drum 8 that is supported so as to be rotatable about a vertical, first axis J1 with respect to the base 7. The robot 3 includes a first arm 9 that is supported so as to be rotatable about a horizontal, second axis J2 with respect to the revolving drum 8, and a second arm 10 that is supported so as to be rotatable about a third axis J3 parallel to the second axis J2 with respect to the first arm 9. The robot 3 is provided with a three-axis wrist unit 11 at a distal end of the second arm 10.

A hand 12, which is a tool for performing a task such as holding a workpiece, is attached to a distal end of the wrist unit 11 of the robot 3. By combining movements of the revolving drum 8 with respect to the base 7, movements of the first arm 9 with respect to the revolving drum 8, and movements of the second arm 10 with respect to the first arm 9, it is possible to dispose the wrist unit 11 at an arbitrary three-dimensional position within the operating range. By operating the three-axis wrist unit 11, it is possible to arbitrarily change the orientation of the hand 12.

The sensor 4 is, for example, a camera that acquires a two-dimensional image. In this embodiment, the sensor 4 is fixed to the hand 12. With this configuration, when the hand 12 is disposed in an arbitrary orientation at an arbitrary three-dimensional position by the operation of the robot 3, the sensor 4 can be also disposed in the arbitrary orientation at the arbitrary three-dimensional position.

Figure 3:
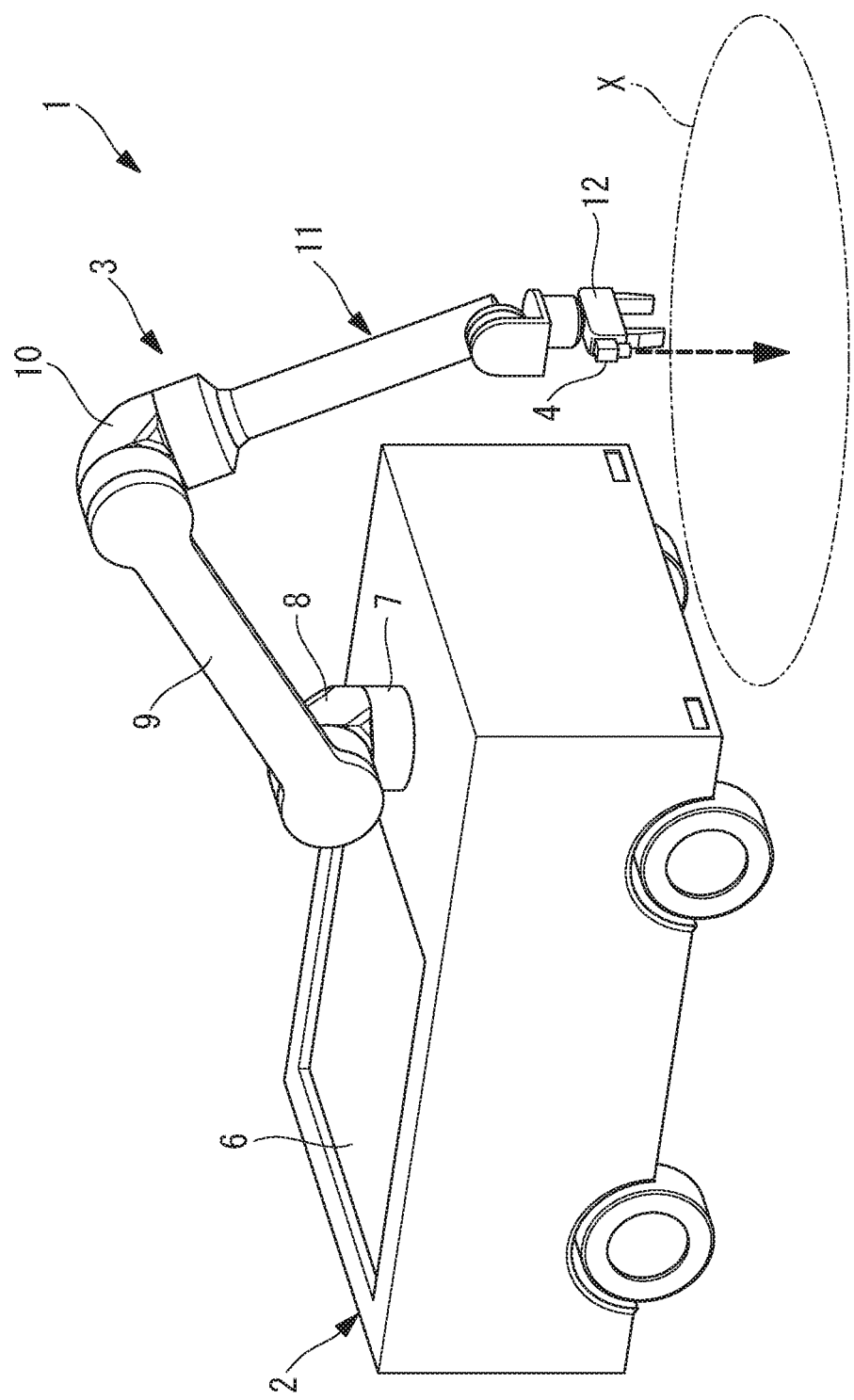

In this embodiment, as shown in FIG. 3, the robot 3 has an operating range such that the robot 3 can cause the sensor 4 to face a road surface at least in front of the unmanned transfer vehicle 2 in a traveling direction.

Figure 4:
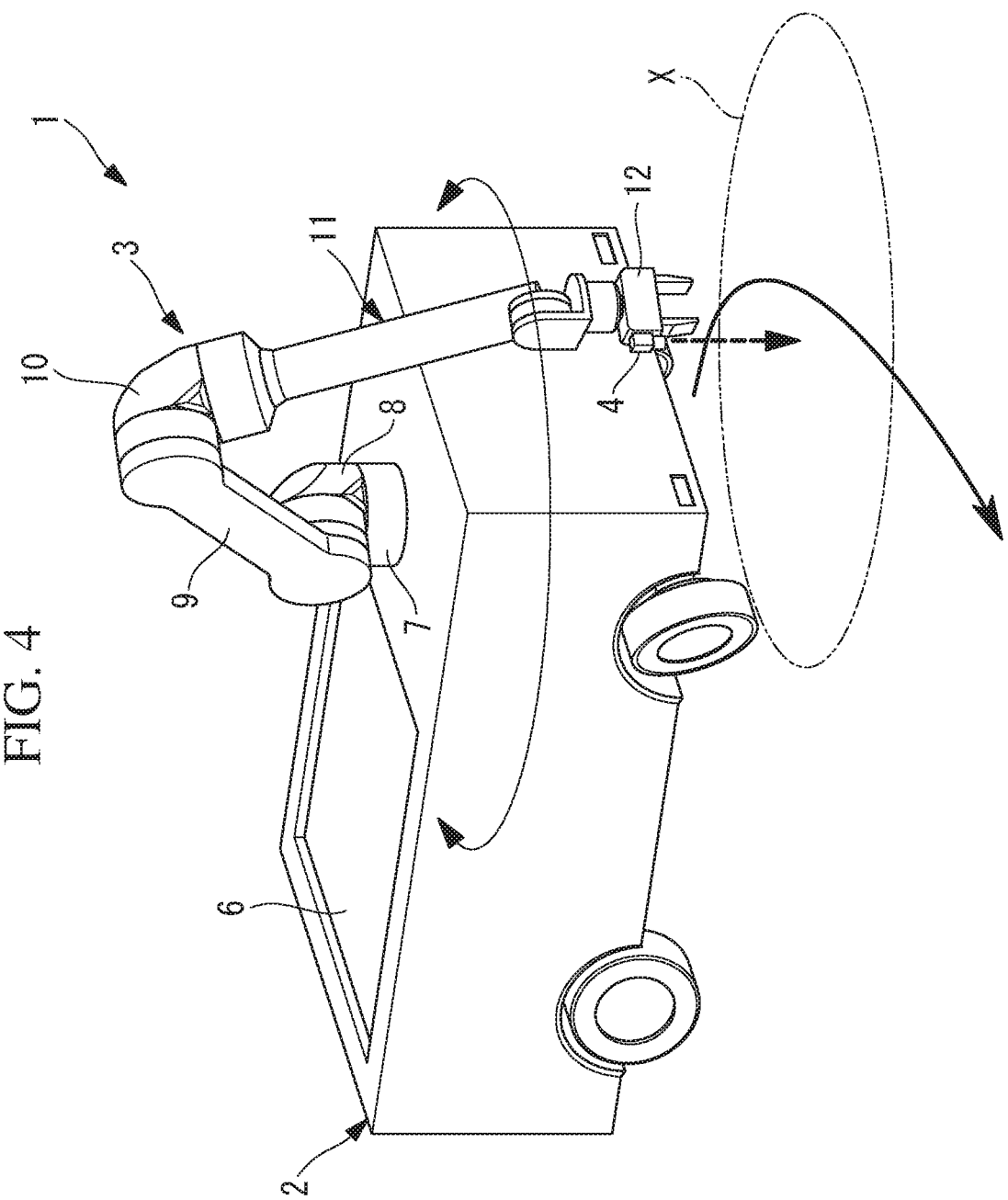

As shown by an arrow in FIG. 4, by rotating the revolving drum 8 about the first axis J1, the robot 3 can move a range X in which the condition of the road surface is detected in the periphery of the unmanned transfer vehicle 2.

The control unit 5 processes data acquired by the sensor 4 to determine the condition of the road surface. Examples of the condition of the road surface are features such as depths of irregularities, pitches of irregularities, the size of irregularities, the inclination of the road surface, and the number and size of obstacles on the road surface, and the control unit 5 extracts these features from the acquired data. For example, in the case in which the sensor 4 is a camera, by acquiring images (data) at certain time intervals during traveling of the unmanned transfer vehicle 2, it is possible to acquire two images having parallax, thereby determining the depths of irregularities. In the case in which the data acquired by the sensor 4 is not input to the control unit 5, the control unit 5 performs control to stop the unmanned transfer vehicle 2.

The control unit 5 calculates a vibration amplitude of the sensor 4 (amplitude of vibrations generated in the unmanned transfer vehicle 2) on the basis of a plurality of data sets acquired in time series by the sensor 4.

Then, by accumulating a large amount of data sets including the traveling speed of the unmanned transfer vehicle 2, the condition of the road surface, and the vibration amplitude, the control unit 5 learns features in those data sets and obtains a learning model. An example of the learning model is a model for estimating, from the condition of the road surface, the maximum value of the traveling speed of the unmanned transfer vehicle 2 at which the vibration amplitude is made equal to or less than a prescribed threshold.

Then, the control unit 5 controls the unmanned transfer vehicle 2 so as to achieve the estimated traveling speed.

The operation of the thus-configured unmanned transfer robot system 1 according to this embodiment will be described below.

With the unmanned transfer robot system 1 according to this embodiment, a case in which the unmanned transfer vehicle 2 moves from one work station A to another work station B along a predetermined traveling path C will be described.

In a case in which the control unit 5 causes the unmanned transfer vehicle 2 to travel in one direction, the robot 3 is operated, as shown in FIG. 3, so as to dispose a range X to be detected by the sensor 4 attached to the hand 12 on a road surface in front of the unmanned transfer vehicle 2 in the advancing direction.

When data about the road surface is acquired by the sensor 4 in this state, the control unit 5 extracts features representing the condition of the road surface from the data, and inputs the extracted features to a learning model. By doing so, the learning model outputs, on the basis of the input features, the maximum value of a traveling speed at which the vibration amplitude is made equal to or less than a prescribed threshold. The control unit 5 controls the unmanned transfer vehicle 2 so as to achieve the output traveling speed.

As a result, in a case in which the condition of the road surface in front of the unmanned transfer vehicle 2 in the advancing direction is bad and it is determined that the vibration amplitude becomes large if the unmanned transfer vehicle 2 travels at the set traveling speed, the unmanned transfer vehicle 2 is caused to travel in a state in which the traveling speed is reduced. By doing so, the amplitude of vibrations generated in the unmanned transfer vehicle 2 is suppressed to the prescribed threshold or less, and it is possible to prevent the occurrence of problems, such as collapse of mounted workpieces and deviation of the unmanned transfer vehicle 2 from the traveling path C due to vibrations, thus allowing the unmanned transfer vehicle 2 to follow the traveling path C in a precise manner. It is also possible to improve the stop position precision of the unmanned transfer vehicle 2.

On the other hand, in a case in which the condition of the road surface in front of the unmanned transfer vehicle 2 in the advancing direction is good, the unmanned transfer vehicle 2 is caused to travel in a state in which the traveling speed is increased. By doing so, it is possible to reduce the traveling time between the work stations A, B while suppressing the vibration amplitude of the unmanned transfer vehicle 2 to the prescribed threshold or less.

With the unmanned transfer robot system 1 according to this embodiment, the sensor 4 for detecting the condition of the road surface is fixed to the hand 12 attached to the wrist unit 11 of the robot 3; thus, there is an advantage in that it is possible to freely set the range X to be detected by the sensor 4 merely by operating the robot 3.

Figure 1:
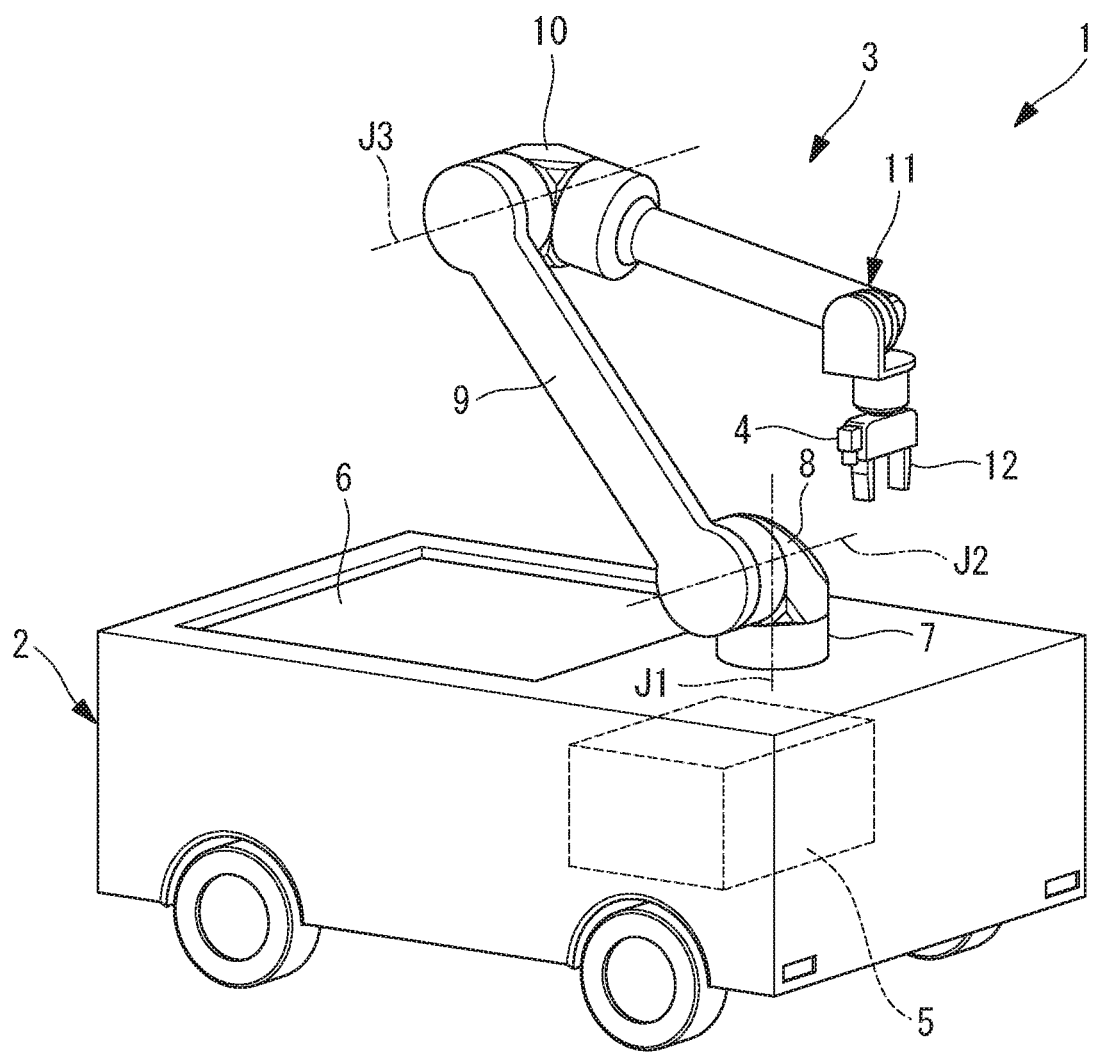
Figure 2:
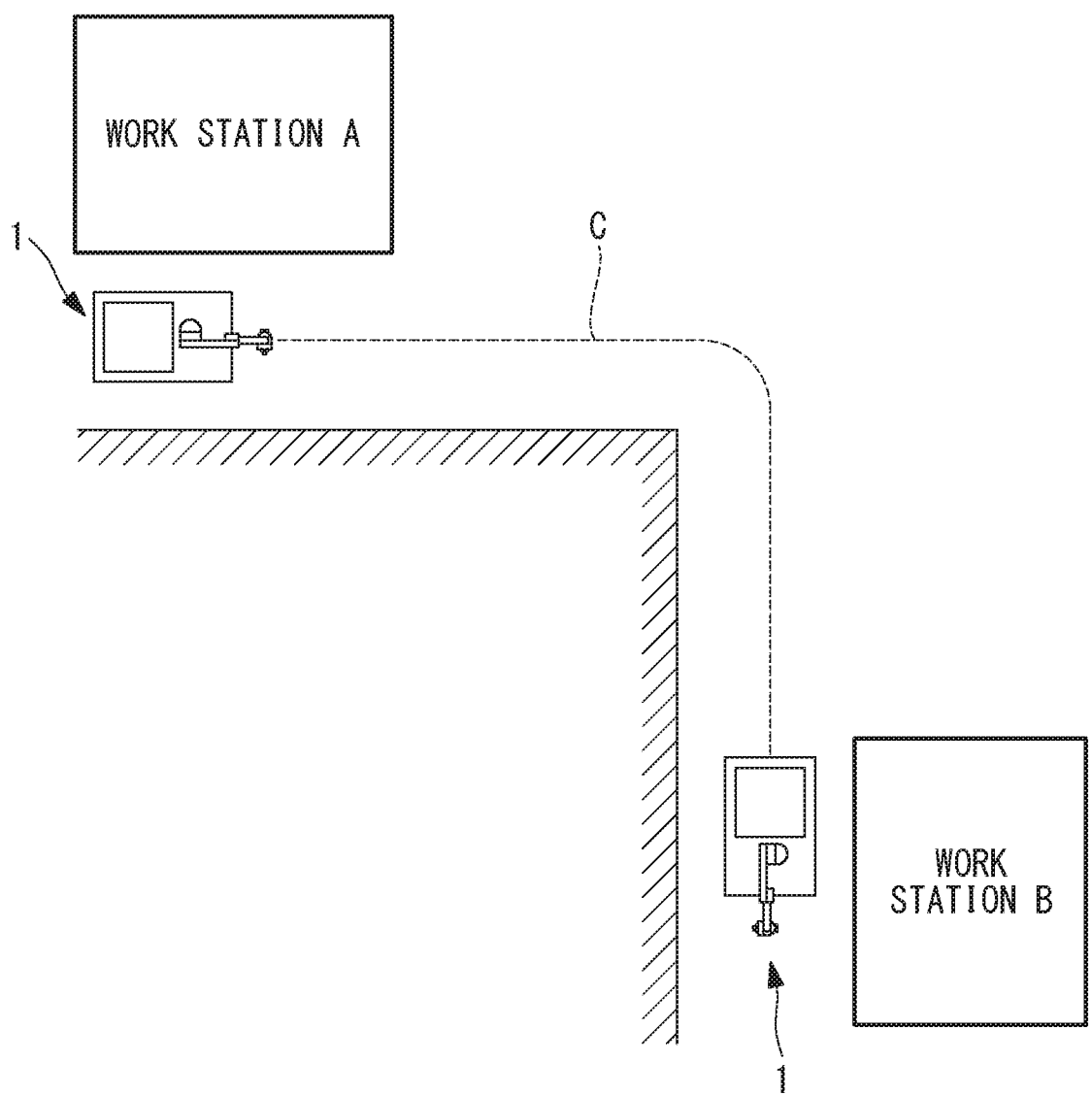

For example, as shown in FIG. 2, in a case in which the traveling path C of the unmanned transfer vehicle 2 is curved, or in a case in which the unmanned transfer vehicle 2 performs a turning operation, it is not possible to detect the condition of the road surface along which the wheels pass if the sensor 4 is fixed to a front portion of the unmanned transfer vehicle 2.

In such a case, as shown in FIG. 4, by rotating the revolving drum 8 about the first axis J1 with respect to the base 7 of the robot 3 and shifting the range X to be detected by the sensor 4 in an obliquely forward direction, it is possible to detect the condition of the road surface ahead of the turning point, in other words, the condition of the road surface along which the wheels pass. In addition, by doing so, it is possible to reduce the traveling speed before the wheels pass along the road surface with a bad condition, and to reliably reduce the amplitude of vibrations generated in the unmanned transfer vehicle 2.

Figure 5:
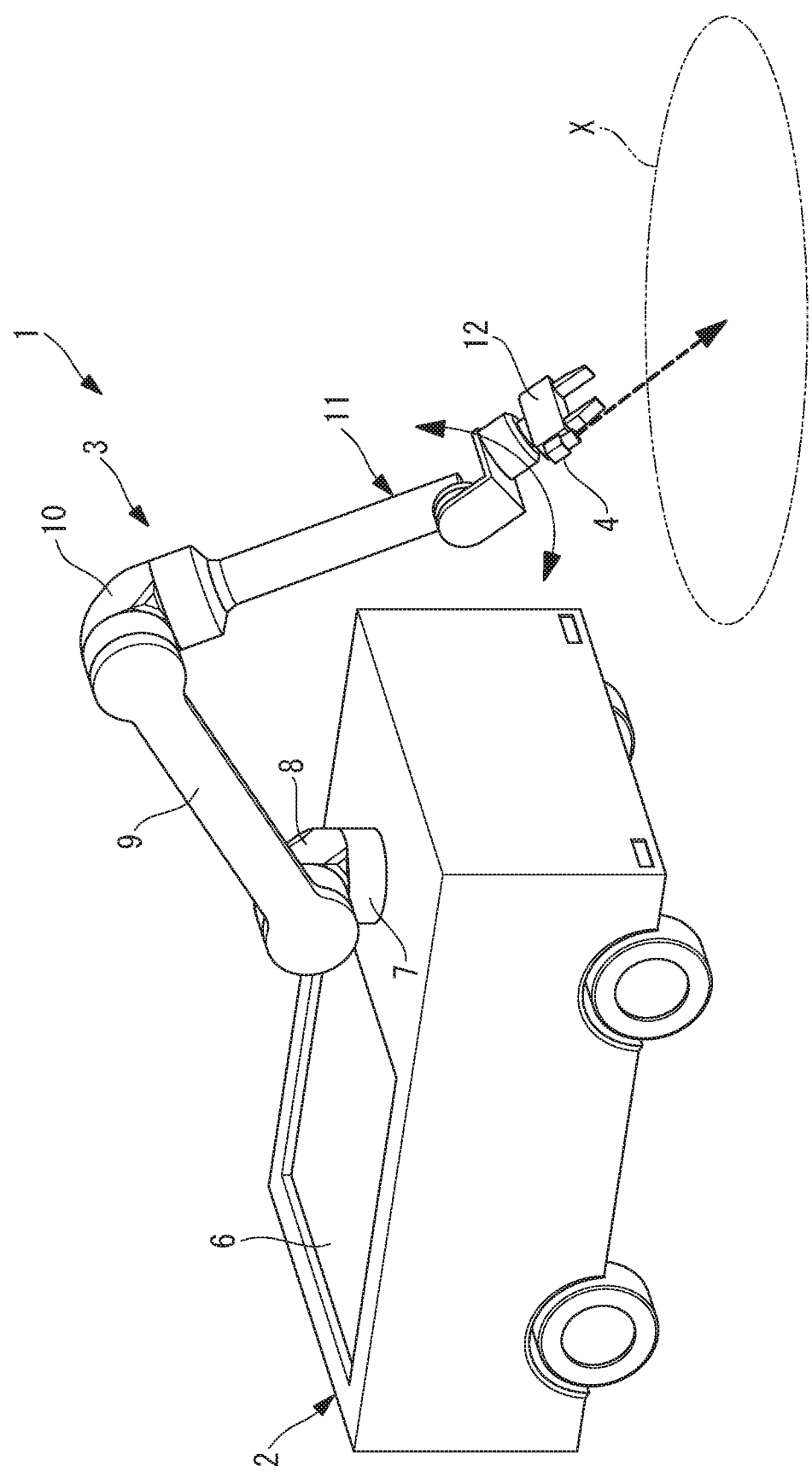

For example, in a case in which the traveling speed of the unmanned transfer vehicle 2 is high, as shown in FIG. 5, the wrist unit 11 is operated so that the range X to be detected by the sensor 4 is disposed at a position farther in front of the unmanned transfer vehicle 2 in the advancing direction. By doing so, even in the case in which the traveling speed is high, it is possible to increase the time from detection of the road surface with a bad condition to passage of the wheels, thereby securing the time required to reduce the speed.

In this embodiment, the control unit 5 obtains a learning model by accumulating a large amount of data sets including the traveling speed of the unmanned transfer vehicle 2, the condition of the road surface, and the vibration amplitude, and by learning features in the data sets, and determines a proper traveling speed from the condition of the road surface by using the obtained learning model. Alternatively, the control unit 5 may extract one or more parameters representing the condition of the road surface on the basis of images acquired by the sensor 4, and may calculate a proper traveling speed by applying said parameters to a calculation formula. The parameters and the calculation formula can be arbitrarily set.

Although a camera capable of acquiring a two-dimensional image has been illustrated as an example of the sensor 4, a camera capable of acquiring a three-dimensional image may be employed. A distance sensor may be employed as the sensor 4. Although the amplitude of vibrations generated in the unmanned transfer vehicle 2 is calculated on the basis of the images acquired over time in this embodiment, alternatively, the vibration amplitude may be detected by a separately provided vibration sensor or acceleration sensor.

In a case in which the unmanned transfer vehicle 2 is capable of changing the advancing direction to the front side, the rear side, or a lateral side of the vehicle body, it suffices that the robot 3 have an operating range such that the robot 3 can dispose the sensor 4 at a position on the front side in the advancing direction. In a case in which it is determined that the unmanned transfer vehicle 2 cannot be allowed to advance due to the condition of the road surface acquired by the sensor 4, control may be performed to stop the unmanned transfer vehicle 2.

The case in which it is determined that the unmanned transfer vehicle 2 cannot be allowed to advance is, for example, a case in which there is a hole having such a size and depth that the wheel completely falls thereinto. Or also in a case in which there is a step having such a height that the wheel cannot get over, in a case in which irregularities on the road surface are severe, etc., it is desirable that control be performed to stop the unmanned transfer vehicle 2.

Control may be performed such that a region in which the condition of the road surface is good is searched for by changing the orientation of the robot 3, and thus shifting the position at which the condition of the road surface is acquired by the sensor 4, so that the unmanned transfer vehicle 2 travels in a good traveling path.

Although a six-axis articulated robot is employed as the robot 3 in this embodiment, a seven-axis articulated robot or a robot of another type may be employed.

Although a sensor 4 that is fixed to the hand 12 has been illustrated as an example in this embodiment, the sensor 4 may be fixed to the revolving drum 8, the first arm 9, the second arm 10, or the wrist unit 11.

In a case in which the sensor 4 is fixed to the revolving drum 8, an adapter for offsetting the fixed position of the sensor 4 such that the sensor 4 projects from the top surface of the unmanned transfer vehicle 2 may be used to enable checking of the road surface.

Although a fixedly attached sensor has been illustrated as an example of the sensor 4, a movably attached type may be employed. In this case, because it is possible to move the position of the sensor 4 with respect to the robot 3, it is possible to dispose the range X to be detected by the sensor 4 at a position farther away by the movable amount of the sensor 4 in addition to the operating range of the robot 3.

Although a sensor that continuously acquires data during traveling of the unmanned transfer vehicle 2 has been illustrated as an example of the sensor 4 in this embodiment, a sensor that acquires data at prescribed time intervals may be employed. The unmanned transfer robot system 1 may include an external input means, and a sensor 4 that acquires data on the basis of a signal input to the control unit 5 from outside may be employed.

Although a configuration in which a single control unit 5 controls the robot 3 and the unmanned transfer vehicle 2 has been illustrated as an example in this embodiment, a plurality of control units 5 may be provided, and one control unit 5 may control the robot 3, whereas the other control unit(s) 5 may control the unmanned transfer vehicle 2.

The invention claimed is:

1. An unmanned transfer robot system comprising:
   an unmanned transfer vehicle that travels on a predetermined traveling path;
   a robot that is mounted on the unmanned transfer vehicle;
   a sensor that is mounted on the robot and that has a predetermined detection range; and
   a controller that controls the robot and the unmanned transfer vehicle,
   wherein the controller:
   operates the robot during traveling of the unmanned transfer vehicle so that a road surface in front of the unmanned transfer vehicle in an advancing direction is included in the predetermined detection range, the road surface in front of the unmanned transfer vehicle in the advancing direction being determined by the predetermined traveling path;
   calculates an amplitude of a vibration predicted to be generated in the unmanned transfer vehicle on the basis of a condition of the road surface detected by the sensor;
   estimates a maximum value of a traveling speed of the unmanned transfer vehicle, the maximum value of the traveling speed making the calculated amplitude of the vibration equal or less than a prescribed threshold; and
   controls the unmanned transfer vehicle on the basis of the estimated maximum value.

2. The unmanned transfer robot system according to claim 1, wherein the controller controls the unmanned transfer vehicle so that the traveling speed of the unmanned transfer vehicle becomes the estimated maximum value.

3. The unmanned transfer robot system according to claim 1, wherein the controller operates the robot so that the road surface farther in front of the unmanned transfer vehicle in the advancing direction is included in the predetermined detection range, as a traveling speed of the unmanned transfer vehicle becomes higher.

4. The unmanned transfer robot system according to claim 1, wherein the sensor acquires data indicating a condition of the predetermined detection range, and
   wherein the controller calculates the amplitude of the vibration predicted to be generated in the unmanned transfer vehicle on the basis of a temporal change in the data acquired by the sensor.

5. The unmanned transfer robot system according to claim 4, wherein the controller estimates the maximum value on the basis of a learning model and the temporal change in the data acquired by the sensor, the learning model being acquired by learning data sets of information about the traveling speed of the unmanned transfer vehicle, information about the condition of the road surface, and information about the vibration generated in the unmanned transfer vehicle.

6. The unmanned transfer robot system according to claim 4, wherein the sensor acquires the data at prescribed time intervals.

7. The unmanned transfer robot system according to claim 4, wherein the sensor acquires the data on the basis of a signal input to the controller from outside.

* * * * *